(12) United States Patent
Tanaka et al.

(10) Patent No.: US 9,460,347 B2
(45) Date of Patent: Oct. 4, 2016

(54) IMAGE PROCESSING APPARATUS AND METHOD FOR PROCESSING IMAGE FOR DETECTING AN IMAGE AREA INCLUDING A DEFECTIVE COLOR TONE

(71) Applicant: CANON KABUSHIKI KAISHA, Tokyo (JP)

(72) Inventors: Wakako Tanaka, Inagi (JP); Kiyoshi Umeda, Kawasaki (JP); Hiroyasu Kunieda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/313,833

(22) Filed: Jun. 24, 2014

(65) Prior Publication Data
US 2015/0003679 A1 Jan. 1, 2015

(30) Foreign Application Priority Data

Jun. 28, 2013 (JP) .................................. 2013-137053

(51) Int. Cl.
| | | |
|---|---|---|
| G06T 7/40 | (2006.01) | |
| H04N 1/62 | (2006.01) | |
| G06T 5/00 | (2006.01) | |
| G06K 9/00 | (2006.01) | |
| H04N 1/60 | (2006.01) | |

(52) U.S. Cl.
CPC ......... *G06K 9/0061* (2013.01); *G06K 9/00275* (2013.01); *G06T 5/005* (2013.01); *H04N 1/6077* (2013.01); *H04N 1/624* (2013.01); *H04N 1/628* (2013.01); *G06T 2207/10024* (2013.01); *G06T 2207/30201* (2013.01); *G06T 2207/30216* (2013.01)

(58) Field of Classification Search
None
See application file for complete search history.

(56) References Cited

U.S. PATENT DOCUMENTS 6,278,491 B1 * 8/2001 Wang .................. G06K 9/0061
348/370
7,289,664 B2 * 10/2007 Enomoto ............. G06K 9/0061
382/162

(Continued)

FOREIGN PATENT DOCUMENTS

| JP | 11-136498 A | 5/1999 |
|---|---|---|
| JP | 11-149559 A | 6/1999 |

(Continued)

OTHER PUBLICATIONS

Luo et al. "An Efficient Automatic Redeye Detection and Correction Algorithm." Proceedings of the 17th International Conference on Pattern Recognition, Aug. 23, 2004, pp. 883-886.*
English translation of JP2011221839A.*

*Primary Examiner* — Jon Chang
(74) *Attorney, Agent, or Firm* — Canon USA, Inc. IP Division

(57) ABSTRACT

The invention includes: specifying a face direction in an image including a face; detecting a red-eye area in the face included in the image; and correcting the detected red-eye area in accordance with a correction standard depending on the specified face direction. Alternatively, the invention includes specifying a face direction in an image; and detecting a red-eye area in a face included in the image in accordance with a detection standard depending on the face direction.

19 Claims, 17 Drawing Sheets

(56) References Cited

U.S. PATENT DOCUMENTS

| | | | |
|---|---|---|---|
| 7,769,233 B2* | 8/2010 | Enomoto | G06K 9/00281 382/118 |
| 2007/0263928 A1* | 11/2007 | Akahori | G06T 7/0002 382/167 |
| 2008/0219518 A1* | 9/2008 | Steinberg | G06K 9/00228 382/118 |
| 2014/0133705 A1* | 5/2014 | Hanita | G06K 9/00845 382/103 |

FOREIGN PATENT DOCUMENTS

| | | | | |
|---|---|---|---|---|
| JP | 11-284874 A | | 10/1999 | |
| JP | 2000-125320 A | | 4/2000 | |
| JP | 2010-520567 A | | 6/2010 | |
| JP | 2010-257482 A | | 11/2010 | |
| JP | 2011-8704 A | | 1/2011 | |
| JP | 2011221839 A | * | 11/2011 | |
| JP | WO 2013008302 A1 | * | 1/2013 | G06K 9/00845 |

* cited by examiner

FIG. 8A

| IMAGE ID | NUMBER OF DETECTED FACES | FACE ID | COORDINATES ||||DIRECTION OF FACE |
| --- | --- | --- | --- | --- | --- | --- | --- |
| | | | UPPER LEFT | LOWER LEFT | UPPER RIGHT | LOWER RIGHT | |
| IMAGE 1 | 1 | 1-1 | (x,y) | (x,y) | (x,y) | (x,y) | 0 |
| IMAGE 2 | 3 | 2-1 | (x,y) | (x,y) | (x,y) | (x,y) | 1 |
| | | 2-2 | (x,y) | (x,y) | (x,y) | (x,y) | 3 |
| | | 2-3 | ... | ... | ... | ... | 0 |
| IMAGE 3 | 2 | 3-1 | | | | | 0 |
| | | 3-2 | | | | | 2 |
| IMAGE 4 | 1 | 4-1 | | | | | 4 |
| IMAGE 5 | 1 | 5-1 | | | | | 0 |
| IMAGE 6 | 2 | 6-1 | | | | | 3 |
| | | 6-2 | | | | | 0 |
| IMAGE 7 | 1 | 7-1 | | | | | 1 |
| IMAGE 8 | 1 | 8-1 | | | | | 0 |
| IMAGE 9 | 2 | 9-1 | | | | | 1 |
| | | 9-2 | | | | | 0 |
| IMAGE 10 | 1 | 10-1 | | | | | 2 |

FIG. 8B

| IMAGE ID | NUMBER OF DETECTED FACES | FACE ID | COORDINATES ||||DIRECTION OF FACE | RED-EYE DETECTION RESULT (PIECE) |
| | | | UPPER LEFT | LOWER LEFT | UPPER RIGHT | LOWER RIGHT | | |
|---|---|---|---|---|---|---|---|---|
| IMAGE 1 | 1 | 1-1 | (x, y) | (x, y) | (x, y) | (x, y) | 0 | 2 |
| IMAGE 2 | 3 | 2-1 | (x, y) | (x, y) | (x, y) | (x, y) | 1 | 1 |
|  |  | 2-2 | (x, y) | (x, y) | (x, y) | (x, y) | 3 | 0 |
|  |  | 2-3 | ... | ... | ... | ... | 0 | 0 |
| IMAGE 3 | 2 | 3-1 |  |  |  |  | 0 | 2 |
|  |  | 3-2 |  |  |  |  | 2 | 0 |
| IMAGE 4 | 1 | 4-1 |  |  |  |  | 4 | 0 |
| IMAGE 5 | 1 | 5-1 |  |  |  |  | 0 | 0 |
| IMAGE 6 | 2 | 6-1 |  |  |  |  | 3 | 1 |
|  |  | 6-2 |  |  |  |  | 0 | 0 |
| IMAGE 7 | 1 | 7-1 |  |  |  |  | 1 | 0 |
| IMAGE 8 | 1 | 8-1 |  |  |  |  | 0 | 0 |
| IMAGE 9 | 2 | 9-1 |  |  |  |  | 1 | 0 |
|  |  | 9-2 |  |  |  |  | 0 | 0 |
| IMAGE 10 | 1 | 10-1 |  |  |  |  | 2 | 1 |
| TOTAL | L=10 | M=15 | M=15 |  |  |  |  | N=7 |

FIG. 8C

| IMAGE ID | NUMBER OF DETECTED FACES | FACE ID | COORDINATES | | | DIRECTION OF FACE | RED-EYE DETECTION RESULT (PIECE) |
|---|---|---|---|---|---|---|---|
| | | | UPPER LEFT | LOWER LEFT | UPPER RIGHT | LOWER RIGHT | | |

| IMAGE ID | NUMBER OF DETECTED FACES | FACE ID | UPPER LEFT | LOWER LEFT | UPPER RIGHT | LOWER RIGHT | DIRECTION OF FACE | RED-EYE DETECTION RESULT (PIECE) |
|---|---|---|---|---|---|---|---|---|
| IMAGE 1 | 1 | 1-1 | (x,y) | (x,y) | (x,y) | (x,y) | 0 | 2 |
| IMAGE 2 | 3 | 2-1 | (x,y) | (x,y) | (x,y) | (x,y) | 1 | 1 |
| | | 2-2 | (x,y) | (x,y) | (x,y) | (x,y) | 3 | - |
| | | 2-3 | ... | ... | ... | ... | 0 | 0 |
| IMAGE 3 | 2 | 3-1 | | | | | 0 | 2 |
| | | 3-2 | | | | | 2 | 0 |
| IMAGE 4 | 1 | 4-1 | | | | | 4 | - |
| IMAGE 5 | 1 | 5-1 | | | | | 0 | 0 |
| IMAGE 6 | 2 | 6-1 | | | | | 3 | - |
| | | 6-2 | | | | | 0 | 0 |
| IMAGE 7 | 1 | 7-1 | | | | | 1 | 0 |
| IMAGE 8 | 1 | 8-1 | | | | | 0 | 0 |
| IMAGE 9 | 2 | 9-1 | | | | | 1 | 0 |
| | | 9-2 | | | | | 0 | 0 |
| IMAGE 10 | 1 | 10-1 | | | | | 2 | 1 |
| TOTAL L=10 | M=15 | M=15 | | | | | | N=6 |

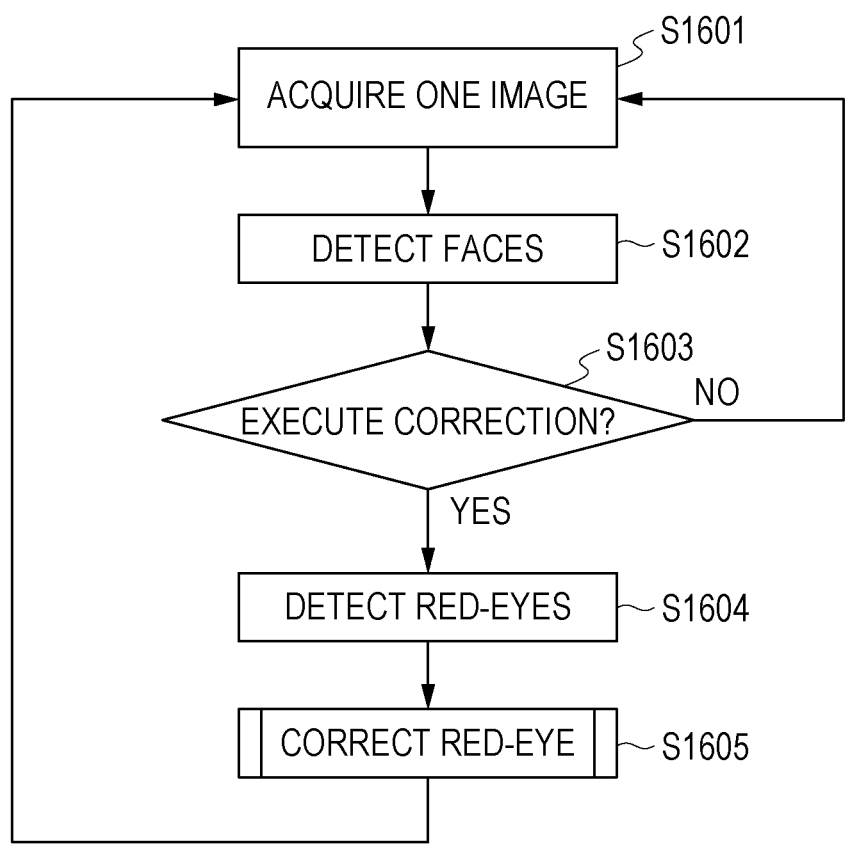

IMAGE PROCESSING APPARATUS AND METHOD FOR PROCESSING IMAGE FOR DETECTING AN IMAGE AREA INCLUDING A DEFECTIVE COLOR TONE

BACKGROUND OF THE INVENTION

1. Field of the Invention

The present invention relates to an apparatus and a method for processing an image. For example, the present invention relates to an apparatus and a method for processing an image to detect or detect and correct an image area including a defective color tone of an eye.

2. Description of the Related Art

Defective color tone of an eye caused by the use of flashlight of a camera in image processing is known as a red-eye phenomenon. The red-eye phenomenon is a phenomenon in which, when animals, such as human beings, dogs and cats, are photographed using flashlight in a dark environment, the flashlight incident in an open pupil is reflected on the eye fundus and capillary vessels there shine red.

Then, a method for correcting a defective color tone of the eye caused by the use of flashlight of a camera has been proposed (see PCT Japanese Translation Patent Publication No. 2010-520567).

In PCT Japanese Translation Patent Publication No. 2010-520567, candidates of areas of a red-eye phenomenon are detected first. The red-eye candidates are then analyzed in accordance with the position and the direction of a face, and the red-eye candidates are narrowed down in consideration of appropriateness regarding the red-eye candidates being located at the position of the eye and red-eye correction is performed.

However, the method described in PCT Japanese Translation Patent Publication No. 2010-520567 has the following problem: if the position of the red-eye candidate is appropriate as the position of the eye, the red-eye candidate is determined as the red-eye and red-eye correction is performed, whereby all the red colored objects located near the eye will be corrected. For example, when a part of eyeglasses or a part of eyeglass frame shines red, correction may be made.

SUMMARY OF THE INVENTION

An aspect of the present invention provides an apparatus and a method for image processing which solves the foregoing problem. Another aspect of the present invention is to provide an apparatus and a method for image processing capable of reducing erroneous detection and erroneous correction which are likely to occur when red-eye detection and red-eye correction are performed.

An aspect of an image processing apparatus of the present invention for solving the foregoing problem includes: a specifying unit configured to specify a face direction in an image which includes a face; a red-eye detection unit configured to detect a red-eye area in the face which is included in the image; and a correcting unit configured to correct the red-eye area detected by the red-eye detection unit in accordance with a correction standard depending on the face direction specified by the specifying unit.

Another aspect of the image processing apparatus of the present invention includes a specifying unit configured to specify a face direction in an image which includes a face; and a red-eye detection unit configured to detect the red-eye area in the face included in the image in accordance with a detection standard depending on the face direction specified by the specifying unit.

Further features of the present invention will become apparent from the following description of exemplary embodiments with reference to the attached drawings.

BRIEF DESCRIPTION OF THE DRAWINGS

FIGS. 8A to 8C are tables illustrating detection results.

FIG. 15 is a flowchart of a red-eye correction process according to another embodiment.

DESCRIPTION OF THE EMBODIMENTS

First Embodiment

Hereinafter, image processing according to an embodiment of the present invention will be described with reference to the drawings. Image processing described hereinafter may be incorporated in a printer driver which operates in a computer that generates image information to be output to a printer engine, and a scanner driver which operates in a computer that drives an optical reading device, such as a scanner. Alternatively, image processing may be incorporated in hardware of each of various devices, such as a copier, a facsimile machine, a printer, a scanner, a digital camera and a digital video camera, or may be provided as software.

Figure 1:
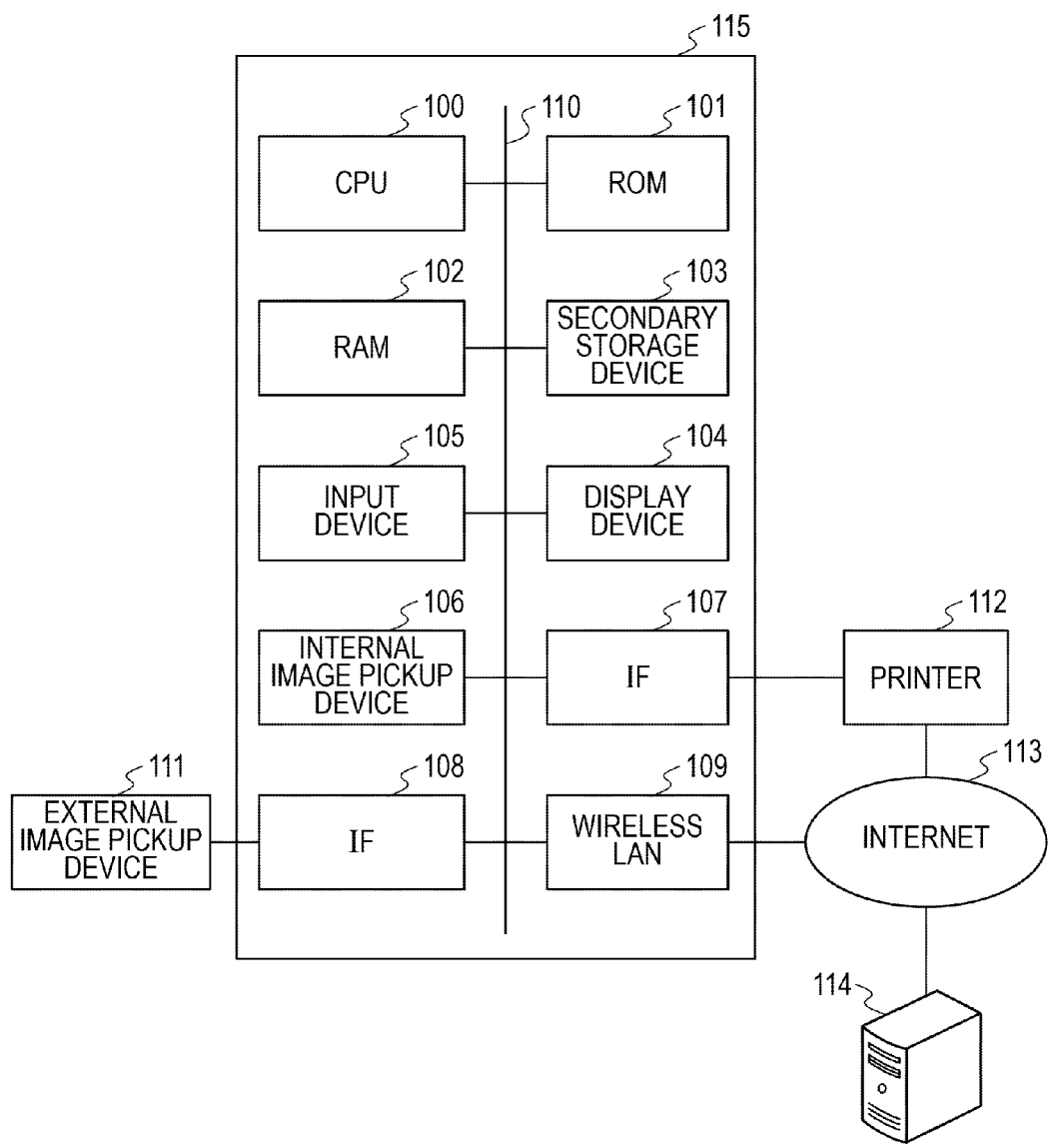
FIG. 1 is a hardware configuration diagram of an image processing apparatus according to a first embodiment.

An information processing device 115 includes a central processing unit (CPU) 100, a ROM 101, a RAM 102, a secondary storage device 103, a display device 104, an input device 105, an IF 107, an IF 108 and a wireless local area network (LAN) 109 as illustrated in FIG. 1. The information processing device 115 further includes an internal image pickup device 106. These components are connected mutually by a control bus/data bus 110. The information processing device 115 of the present embodiment functions as an image processing apparatus.

The information processing device 115 is, for example, a computer. The CPU 100 performs information processing which will be described in a first embodiment in accordance with a program. The CPU 100 controls the entire information processing device 115 by causing a program to be loaded from the ROM 101 or the secondary storage device 103 to the RAM 102 and executing the program on the RAM 102.

Later-described programs, such as applications to be executed by the CPU 100, are stored in the ROM 101. The RAM 102 provides a memory for temporarily storing various types of information when the programs are executed by the CPU 100. The secondary storage device 103 is, for example, hard disk and is a storage medium for storing database and the like in which an image files and an image analysis result are stored. The display device 104 is, for example, a display on which a processing result of the first embodiment, the following user interface (UI) and the like are presented to a user. The display device 104 may have a touch panel function. The input device 105 is a mouse, a keyboard and the like with which the user inputs, for example, instructions regarding processes of image correction.

An image picked up by the internal image pickup device 106 undergoes a predetermined image processing and is then stored in the secondary storage device 103. The information processing device 115 may also read image data from an external image pickup device 111 which is connected via an interface (the IF 108). Further, the wireless LAN 109 is connected to the Internet 113. The information processing device 115 may acquire image data from an external server 114 which is connected to the Internet 113.

A printer 112 for outputting an image and the like is connected to the information processing device 115 via the IF 107. The printer 112 is further connected to the Internet and may transfer and receive print data via the wireless LAN 109.

Figure 2A:
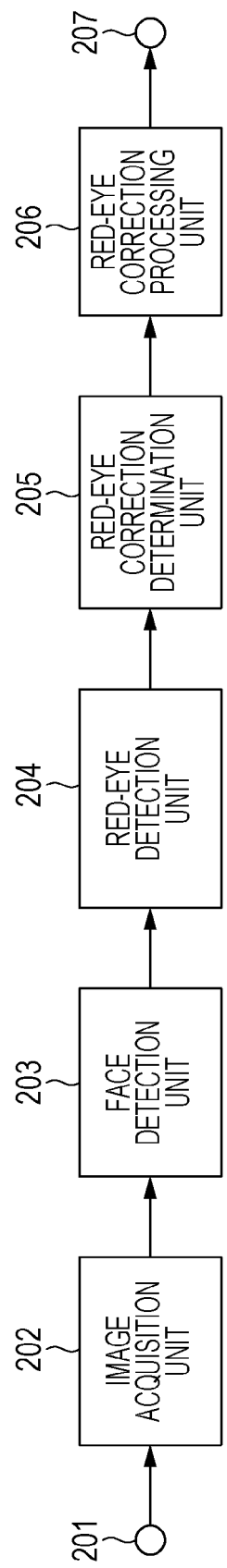
FIGS. 2A and 2B are software block diagrams according to the first embodiment.
Figure 2B:
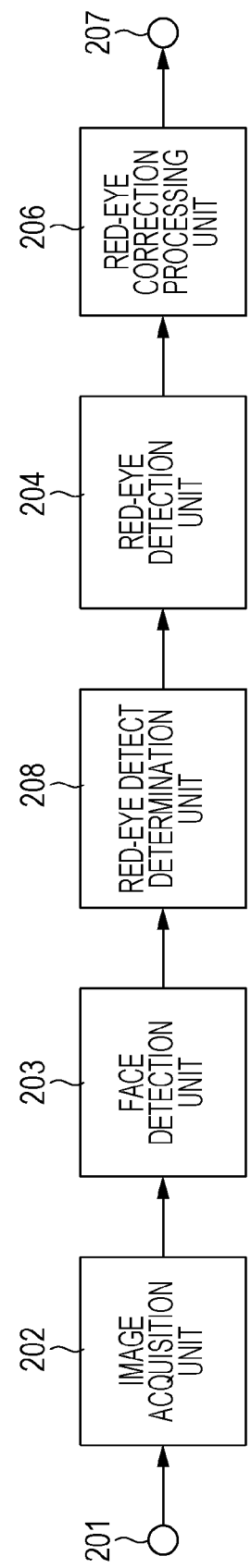

In the present embodiment, an automatic red-eye correction process will be described. FIGS. 2A and 2B are functional block diagrams each illustrating an outline of an automatic red-eye correction process according to the present embodiment. These series of processes are executed by the CPU 100.

First, the automatic red-eye correction process illustrated in FIG. 2A will be described. As illustrated in FIG. 2A, an image acquisition unit 202 first acquires image data to be input in an input terminal 201. The image data to be input may be acquired from each device or may be stored in advance in the secondary storage device 103. Although the image data to be input is not particularly limited, an example thereof is 24-bit digital image data, each 8 bits per pixel of R, G and B. The acquired image data is input in a face detection unit 203. Here, all the image data may be input in the face detection unit 203 after all the image data is stored in the secondary storage device 103, or the image data may be input in the face detection unit 203 upon acquisition thereof.

The face detection unit 203 detects a face area and the direction of the face from the image data acquired by the image acquisition unit 202. Although the method for detecting the face area is not particularly limited, the method for detecting the face area by the AdaBoost is used in the present embodiment (detailed description thereof will be described later).

A red-eye detection unit 204 detects a red-eye area from the image data acquired by the image acquisition unit 202. Although the method for detecting the red-eye area is not particularly limited, an exemplary method therefor is first extracting a red-colored area by adaptive binarization and then extracting an area marked with a red circle by boundary tracking. Detection results of the red-eye detection unit 204 are not perfect but it is possible that red and round areas are detected. For example, it is possible that various objects, such as red signals, red patterns of clothes and red illumination, are detected.

The red-eye correction determination unit 205 performs a determination process of correction in the red-eye correction processing unit 206 on the detection result of the red-eye detection unit 204 using the detection result of the face detection unit 203. Specifically, the determination process includes determination as to whether the correction should be performed in the red-eye correction processing unit 206 or determination regarding correction intensity in the red-eye correction processing unit 206. Details thereof will be described later.

The red-eye correction processing unit 206 performs the red-eye correction process in accordance with the determination result determined by the red-eye correction determination unit 205.

Next, the automatic red-eye correction process illustrated in FIG. 2B will be described. The automatic red-eye correction process illustrated in FIG. 2B is different from that illustrated in FIG. 2A.

Since the image acquisition unit 202 and the face detection unit 203 are the same as those of FIG. 2A, description thereof is omitted. Using the detection result of the face detection unit 203, a red-eye detection determination unit 208 determines as to whether detection in the red-eye detection unit 204 is to be performed or determines regarding detection conditions in the red-eye detection unit 204. Details thereof will be described later.

Both the red-eye correction determination unit 205 in FIG. 2A and the red-eye detection determination unit 208 in FIG. 2B perform determination in accordance with the direction of a face detected by the face detection unit 203. Here, the face detection unit 203 will be described in detail. Although the method for detecting the face in the face detection unit 203 is not particularly limited, the detection process in the present embodiment is performed using a face detection algorithm in which the AdaBoost is used. The AdaBoost is a technique to design a strong classifier by connecting in series multiple weak classifiers each having luminosity distribution that seems as a face. Such a technique is disclosed in, for example, Japanese Patent Laid-Open No. 2011-8704. Each of the multiple weak classifiers makes determination using the luminosity distribution that seems as a face as a determination standard. Each weak classifier has a luminosity distribution of slightly different pattern as the determination standard. Image data determined to seem as a face in all the weak classifiers is a face with high possibility and, therefore, is output as a face. In the present embodiment, it is possible to discriminate the face direction unlike the publicly known AdaBoost.

Figure 3:
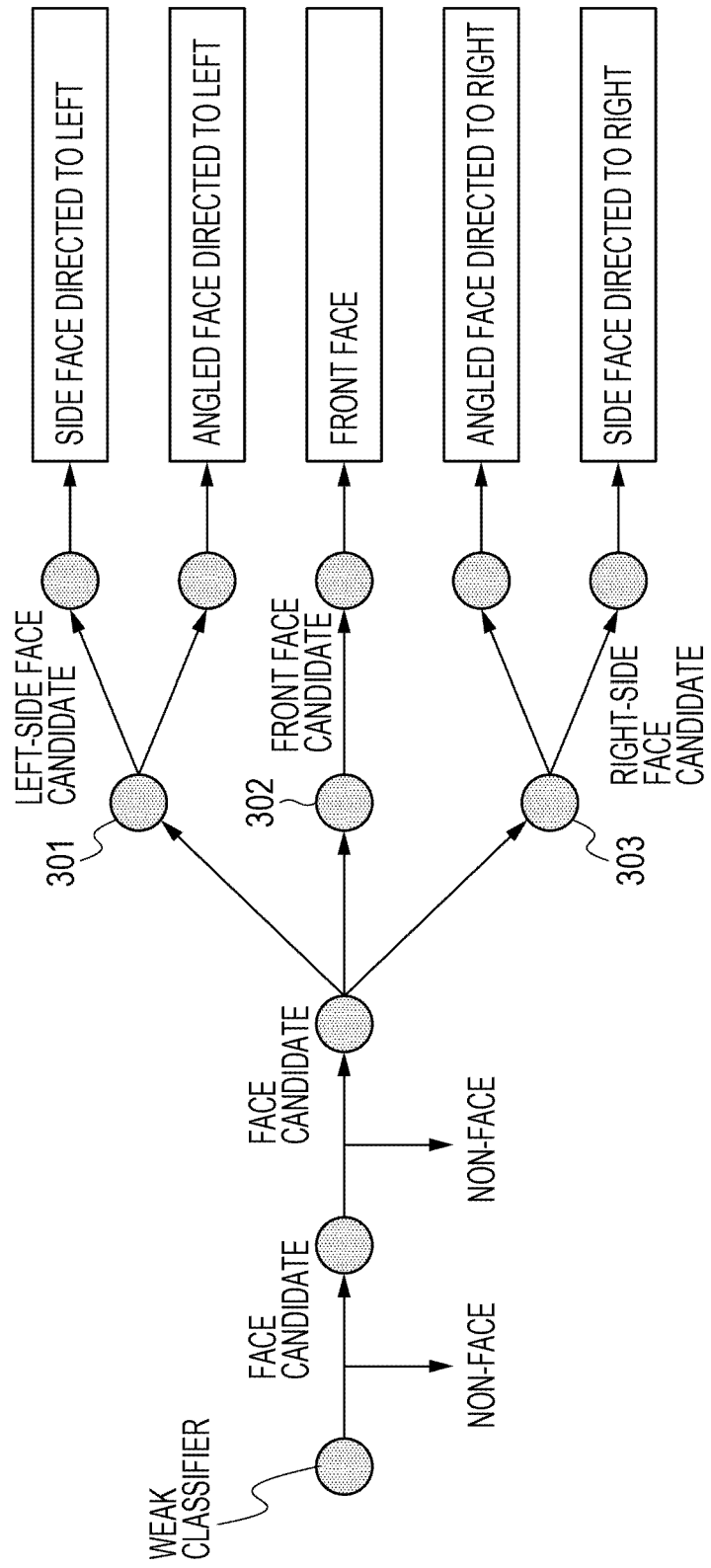
FIG. 3 is an explanatory view of a face detection unit according to the first embodiment.

FIG. 3 is an explanatory view of the face detection unit 203 according to the present embodiment and, in particular, is a concept illustration of a configuration of the AdaBoost of a branching structure. In the present embodiment, as illustrated in FIG. 3, plural weak classifiers are connected to implement a strong classifier (that is, a detector). Here, the branching structure in which face direction is classified into five stages is described as an example, but the number of classified face directions is not limited to the same.

As illustrated in FIG. 3, plural weak classifiers are connected in series and, after branching depending on the face directions, plural weak classifiers are further connected in series. For each weak classifier, the Haar type rectangular feature quantity is defined. A rectangular feature quantity is analyzed for each rectangular area and, if a relationship between feature quantities is the same as that learned in advance, evaluation values are added. A rectangular feature quantity to be analyzed differs for each weak classifier. In the present embodiment, the weak classifier first used is a rectangular feature quantity that does not specify the face direction and, then, three face directions, i.e., left, right and front are discriminated using the weak classifiers 301, 302 and 303. In other words, one or more weak classifiers before the branching make discrimination in accordance with a standard corresponding to all the directions of the object and one or more weak classifiers after the branching depending on the direction of the object make discrimination in accordance with standards depending on the direction of the object. The detected face direction and face area are thus discriminated in the present embodiment.

Figure 4A:
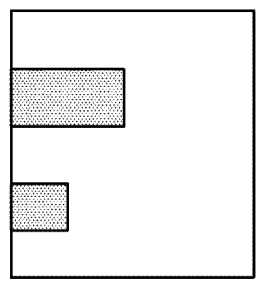
FIGS. 4A to 4C are explanatory views of rectangular feature quantities of a face detection unit according to the first embodiment.
Figure 4B:
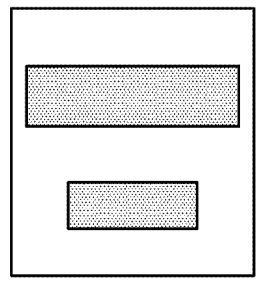
Figure 4C:
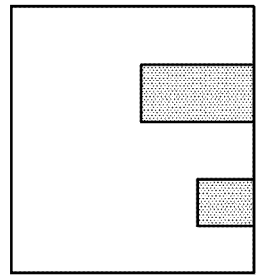

Here, the rectangular feature quantity will be briefly described with reference to FIGS. 4A to 4C. FIGS. 4A to 4C illustrate an example of rectangular feature quantities of the weak classifiers 301, 302 and 303. FIG. 4A illustrates a rectangular feature quantity of the weak classifier 301 which detects the face directed to the left. FIG. 4B illustrates a rectangular feature quantity of the weak classifier 302 which detects the face directed to the front. FIG. 4C illustrates a rectangular feature quantity of the weak classifier 303 which detects the face directed to the right. Each of FIGS. 4A to 4C includes two black painted portions; an upper black painted portion substantially represents an eye area and a lower black painted portion substantially represents a mouth area. If there is a predetermined feature quantity in these areas, it is determined that a rectangular area including these areas is a face.

Returning to FIG. 3, in the present embodiment, reliability is calculated in each weak classifier depending on the determined result. In particular, when it is determined that a calculated value calculated by the weak classifier is equal to or greater than a threshold $Th_1$ (hereafter, referred also to as a calculation threshold) with respect to a calculated value set in the weak classifier, a preset value is added to a score and reliability is calculated. On the other hand, when it is determined that the calculated value calculated by the weak classifier is smaller than the calculation threshold $Th_1$ set in the weak classifier, a preset value is subtracted from the score and reliability is calculated. In the subsequent weak classifier, similarly, in accordance with the determination result, a preset value of the weak classifier is added to or subtracted from the score (i.e., reliability calculated by the previous weak classifier). The set calculation threshold $Th_1$ may be different for each weak classifier or may be the same for all the weak classifiers. A threshold $Th_2$ (hereafter, referred also to as a score threshold) to the score is set to each weak classifier. If the calculated reliability is lower than the score threshold $Th_2$, the process is stopped. In this manner, processes in the subsequent weak classifiers may be skipped and thus the process may be performed at a high speed. The set score threshold $Th_2$ may be different for each weak classifier or may be the same for all the weak classifiers. When reliability is calculated from the last weak classifier of plural weak classifiers prepared in advance, it is determined that the analyzed area is a face. If plural branching portions become candidates, the portion with highest reliability calculated from the last weak classifier is set as the face direction.

Here, the reference numeral 301 denotes a weak classifier array for detecting a side face directed to the left. The weak classifier array 301 consists of plural weak classifiers connected in series for detecting a side face directed to the left. An area which has passed the weak classifiers directed to the left provided in the downstream of the weak classifier array 301 is determined as an area for a side face directed to the left. Further, a weak classifier for a side face and a weak classifier for an angled face are used and areas which passed these weak classifiers are respectively defined as a side face directed to the left and an angled face directed to the left.

The reference numeral 302 denotes a weak classifier array for detecting a front face. The weak classifier array 302 consists of plural weak classifiers connected in series for detecting a face directed to the front. An area which has passed all the weak classifiers directed to the front provided in the downstream of the weak classifier array 302 is defined as an area for a face directed to the front.

The reference numeral 303 denotes a weak classifier array for detecting an angled face directed to the right. The weak classifier array 303 consists of plural weak classifiers connected in series for detecting an angled face directed to the right. An area which has passed the weak classifiers directed to the right provided in the downstream of the weak classifier array 303 is determined as an area for a side face directed to the right. Further, a weak classifier for an angled face and a weak classifier for a side face are used and areas which passed these weak classifiers are respectively defined as an angled face directed to the right and a side face directed to the right.

Here, classification of the face direction illustrated in FIG. 3 will be described. Classification of the face direction is set at the time of designing the weak classifiers. Regarding classification of the face direction, for example, it is sufficient to acquire detection patterns of faces of plural sample images in advance and sets the face direction in the weak classifier in accordance with the acquired result. Classification of the face direction is not limited to the same: face directions may be classified in accordance with an objective determination by a user; if an angle of a camera with respect to the object is known, classification may be made based on the angle information; or classification may be made based on the positional relationship of organs.

When all the weak classifiers on the branchings through which the image data passes finally determine the image data as a face candidate, coordinates and the direction of the face area are output. That is, as a result of the process by the face detection unit 203, the number of faces of the figures, the coordinate position of each face and the face direction may be acquired for each input image.

In the present embodiment, five-stage face directions are output as illustrated in FIG. 3: the side face directed to the left, the angled face directed to the left, the front face, the angled face directed to the right, and the side face directed to the right. However, the face directions are not limited to the same. For example, by preparing classifiers capable of discriminating face direction at smaller angles, it is possible to discriminate the face directions into five or more stages or discriminate the face directions into substantially continuous directions.

In the present embodiment, in a series of detection process described above, the process is stopped when an addition evaluation value to which the evaluation value of each rectangular area is added becomes equal to or smaller than a predetermined threshold in each weak classifier. In this manner, speeding up of the process is possible. Hereafter, a degree that the face is directed using the face directed to the front as a standard will be referred to as a "degree that the face is directed to the side." Here, for example, in a case in which the face direction in the face area is determined in accordance with the position of the eye as an organ of the face, when only one of the eyes is detected, it is determined that the face is directed to the side. In a case in which the face direction is detected by such a method, if no eye is detected, the rectangular area is excluded from the detection target. In the present embodiment, when the face is directed to the just lateral side, i.e., when the face direction is at 90 degrees to the front, the degree that the face is directed to the side becomes the maximum. However, the maximum value of the degree that the face is directed to the side is not limited to the same. On the contrary, the degree that the face is directed to the side becomes smaller as the face direction approaches the front.

Note that the face direction may be expressed by the output results at plural stages as described above, but may also be expressed by a flag indicating whether the face direction is the front face or not.

Next, the red-eye detection unit 204 will be described in detail. Publicly known methods may be employed for the red-eye detection of a figure. As a publicly known method, for example, a method disclosed in Japanese Patent Laid-Open No. 2010-257482 is used. In particular, a red-colored area is extracted by adaptive binarization, an area marked with a red circle is extracted by boundary tracking and then feature quantity determination is made to the result of the extraction. First, a red-colored area is extracted by adaptive binarization. By applying an adaptive binarization process to the input image data, a red-colored area is extracted from the image data. In particular, a red color evaluation quantity representing a degree of red color with respect to each pixel of the image data is calculated, an evaluation quantity thereof and threshold are compared and, if the evaluation value is greater than the threshold, a target pixel is determined as red. The threshold is determined adaptively in a peripheral area of the target pixel. "Binarization" here means allocating '1' to a pixel determined as red and allocating '0' to a pixel determined otherwise. Extraction precision in the red-colored area may be increased by calculating the red color evaluation quantity of the target pixel only from R and G of the RGB pixel value instead of from the chroma of the typical HSI system.

Next, an area marked with a red circle is extracted by boundary tracking. First, a binary image obtained by the adaptive binarization process is scanned from an upper end thereof. A target pixel of which a value of the target pixel (xa, ya) is '1,' and values of the left pixel (xa−1, ya), upper left pixel (xa−1, ya−1), upper pixel (xa, ya−1) and upper right pixel (xa+1, ya−1) of the target pixel are '0' is set as the scanning starting point. Then a pixel of which value is '1' is tracked counterclockwise until it returns to the viewpoint from the starting point pixel. In this tracking process, the peripheral length (the number of pixels) of the tracking target area, the direction histogram, and the maximum values and the minimum values of the X coordinate and the Y coordinate may be obtained. From these values, an aspect ratio and appropriateness of the size of the red-colored area are considered and a determination process as to whether the red-colored area is a red circle or not is performed.

Then regarding the last extracted area marked with a red circle, various feature quantities with which the portion may be specified as a red-eye of a human being are calculated, the feature quantities are compared with preset thresholds, and then it is determined whether the portion is a red-eye or not.

The method for detecting the red-eye is not limited to that described above and, for example, the methods disclosed in Japanese Patent Laid-Open No. 11-136498, No. 11-149559, No. 2000-125320 and No. 11-284874 may be used.

Figure 5:
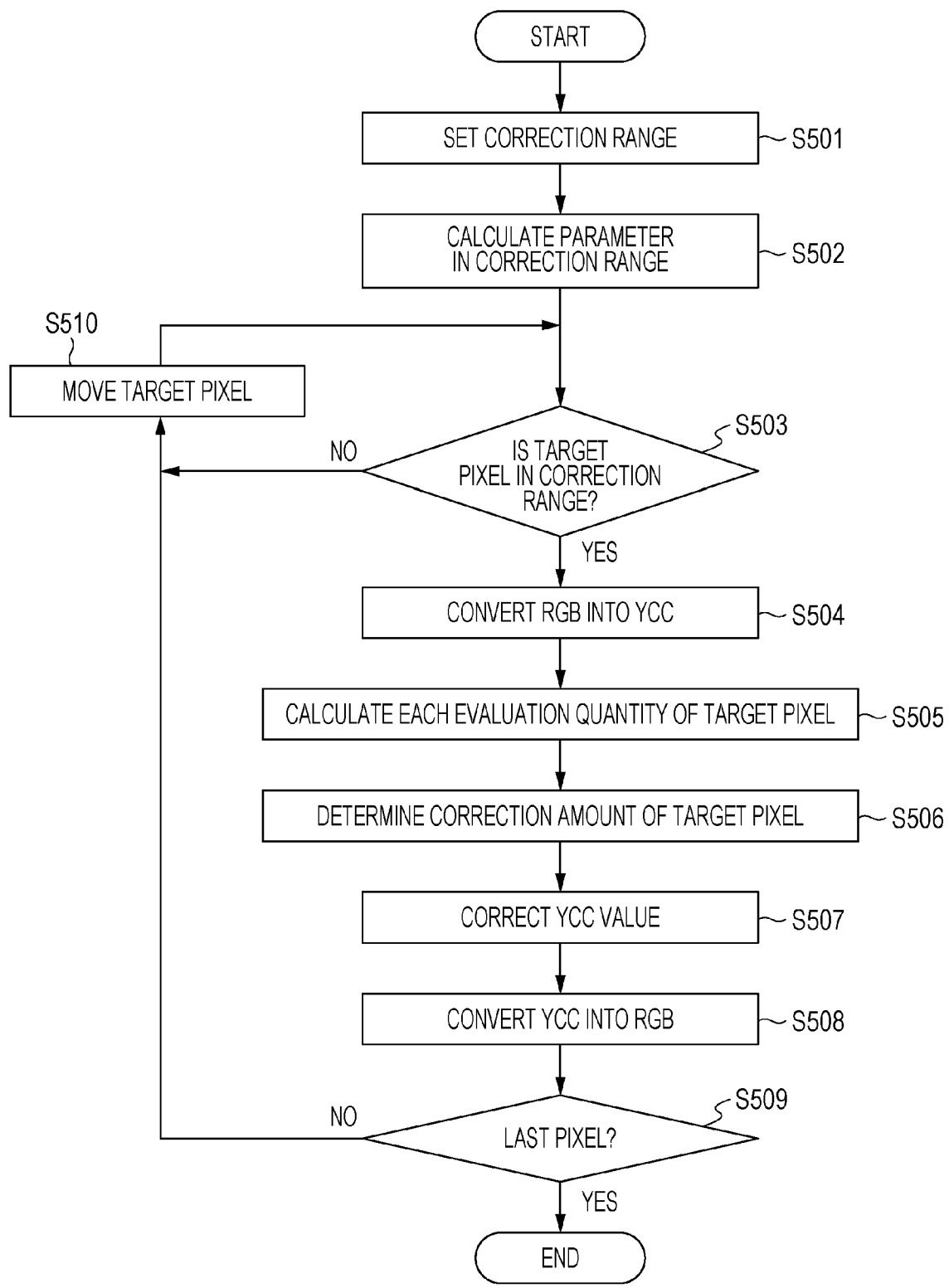
FIG. 5 is a flowchart of a red-eye correction process according to the first embodiment.

Next, the red-eye correction processing unit 206 will be described with reference to FIGS. 5, 6A and 6B. FIG. 5 is a flowchart of a correction process of a red-eye area performed by the red-eye correction processing unit 206.

In the red-eye correction processing unit 206, image data constituted by RGB components and information about the red-eye area obtained in the preceding processes are input.

First, as illustrated in FIG. 5, a correction range is set to a target red-eye area (S501). Here, determination of the correction range will be described with reference to FIGS. 6A and 6B. FIGS. 6A and 6B are explanatory views illustrating determination of the correction range.

Figure 6A:
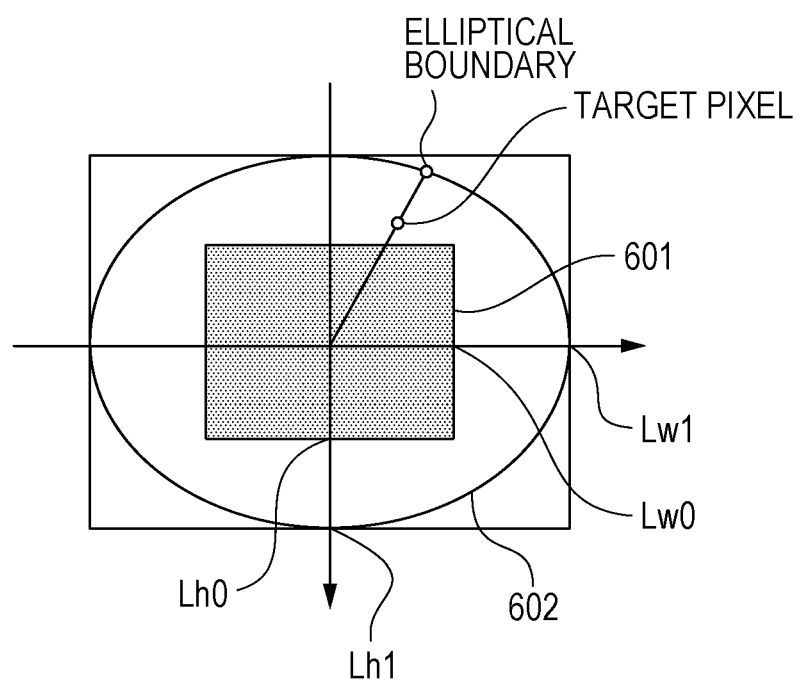
FIGS. 6A and 6B are explanatory views illustrating determination of a correction range according to the first embodiment.

In FIG. 6A, the central rectangular area is a red-eye area 601. An elliptical correction area 602 with a longer axis Lw1 and a shorter axis Lh1 passing through the center of the red-eye area 601 is set. Lw1 and Lh1 are calculated by the following formula (1).

$$Lw1 = Lw0 \times CPARAM\_AREARATIO$$

$$Lh1 = Lh0 \times CPARAM\_AREARATIO \qquad (1)$$

(Lw0 and Lh0 each is half the width and half the height of the red-eye area 601 and CPARAM_AREARATIO represents a parameter for determining the correction range.)

Next, parameters necessary for the correction in the correction area 602 are calculated (S502). The parameters to be calculated are the maximum brightness value Ymax inside the elliptical area and the maximum value Ermax of an evaluation quantity Er expressed by Equation (3).

Next, whether the target pixel exists in the correction area 602 is determined (S503). Whether the target pixel exists in the correction area 602 is determined in accordance with the following formula (Equation 2) by which an ellipse is calculated.

$$(x/Lw1)^2 + (y/Lh1)^2 \leq 1 \qquad (2)$$

((x, y) is the coordinate of the target pixel, where the origin of coordinates is the center of the target red-eye area.)

When the coordinate of the target pixel (x, y) satisfies Equation (2), it is determined that the target pixel exists in the correction area 602 and the process proceeds to S504.

If the coordinate of the target pixel (x, y) does not satisfy Equation (2), it is determined that the target pixel does not exist in the correction area 602, the target pixel is moved to the next pixel (S510) and the process returns to S503.

In S504, the RGB component values of the target pixel are converted into YCC values of brightness and color difference components (S504). The method for converting the RGB component values of the target pixel to the YCC values is not particularly limited.

Next, the evaluation quantities to the target pixel are calculated (S505). The evaluation quantities are parameters necessary to determine the correction amount in subsequent S506 and, specifically, consist of the following three values.
(1) a ratio r/r0 between a distance r from the center of the red-eye area 601 to the target pixel and a distance r0 from the center to a boundary of the ellipse
(2) a ratio Er/Ermax between the evaluation quantity Er of the target pixel and the maximum value Ermax of the evaluation quantity
(3) a ratio Y/Ymax between brightness Y of the target pixel and the maximum brightness value Ymax Next, a correction amount Vy of the brightness Y and a correction amount Vc of the color difference components Cr and Cb of the target pixel are calculated by Equation (3) using the parameters obtained in S505 (S506).

$$Vy=\{1-Rr Ty1\}\cdot\{1-(1-Re)Ty2\}\cdot\{1-Ry Ty3\}$$

$$Vc=\{1-Rr Tc1\}\cdot\{1-(1-Re)Tc2\} \quad (3)$$

(Rr=r/r0, Re=Er/Ermax, Ry=Y/Ymax; both Vy and Vc are 0.0-1.0.)

Regarding the values of Vy and Vc, the closer to 1.0, the larger the correction amount.

The correction amount Vy of the brightness is determined using all the three parameters calculated in S505. The correction amount Vy of the brightness becomes small as the position of the target pixel separates from the center of the correction area 602. In a case in which the evaluation quantity Er of the target pixel is smaller than the maximum value Ermax, the correction amount Vy becomes small. In a case in which the brightness value Y of the target pixel is close to the maximum value Ymax, the correction amount Vy becomes small. A highlighted portion (catchlight) in the eye may be stored by reducing the correction amount Vy of the pixel with high brightness.

The correction amount Vc of the color difference is determined using two parameters except for the parameter about brightness among the three parameters calculated in S505.

Figure 6B:
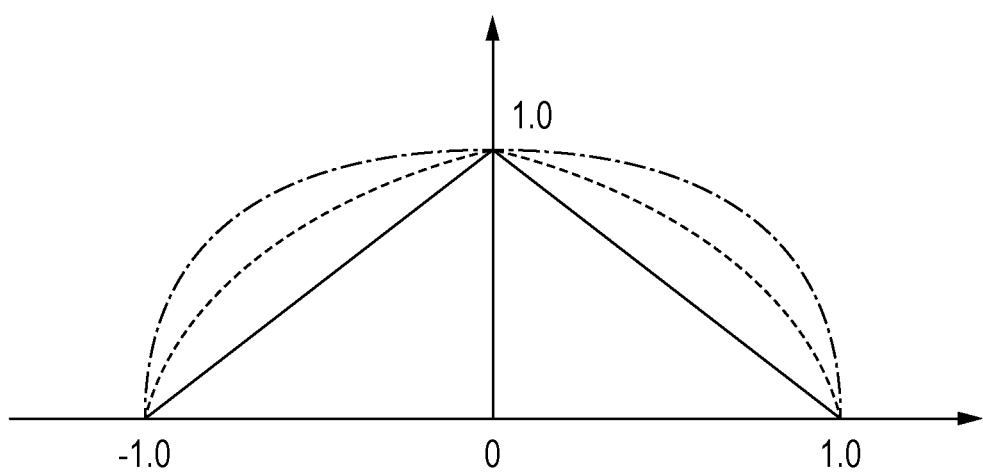

In Equation (3) described above, by setting of each of the parameters Ty1, Ty2, Ty3, Tc1 and Tc2, each evaluation quantity (the value inside { } of Equation (3)) may be applied to a straight line or a curved line, such as a primary (solid line), a secondary (dashed line) and tertiary (dash-dot line) lines as illustrated in FIG. 6B.

Next, a YCC value after correction is calculated by the following formula (4) using the correction amounts Vy and Vc (S507).

$$Y'=(1.0-Wy\cdot Vy)\cdot Y$$

$$C'=(1.0-Wc\cdot Vc)\cdot C \quad (4)$$

(Y and C are values before correction, Y' and C' are values after correction, and Wy and Wc are weights (0.0 to 1.0).)

Correction intensity may be designated by adjusting the weights Wy and Wc. For example, when the correction intensity is set to three stages of weak, middle and strong, results with different correction intensity may be obtained by the same process by setting both Wy and Wc to 0.3, 0.7, 1.0 and the like.

When new values of brightness and color difference component are determined, the YCC values are converted into the RGB values (S508). The obtained RGB value is overwritten in a memory buffer for an input image as a pixel value after correction, or is stored in a predetermined address of the memory buffer which stores an image to be output.

Then whether the current pixel is the last pixel or not is determined (S509). If the current pixel is not the last pixel, the process proceeds to S510 where the target pixel is moved and the process returns to S503. In this manner, the process described above (S503 to S508) is repeated until the last pixel corresponding to the target red-eye area is reached.

In the foregoing embodiment, the image to be input in the red-eye correction processing unit 206 is constituted by the RGB components, which input image is converted into brightness and color difference components, corrected, and then returned to the RGB components again. However, the correction process of the red-eye area is not limited to the same. For example, if the RGB components are converted into brightness and chroma, and the brightness and chroma are corrected by the same method described above and then returned again to the RGB components, substantially the same output result may be obtained.

Further, in the foregoing, an example has been described in which a ratio Er/Ermax between the evaluation quantity Er of the target pixel and the maximum value Ermax of the evaluation quantity in the correction area 602 is used as the parameter for determining the correction amount. However, the parameter may be simply displaced by the chroma. That is, the correction amount may be determined using the ratio between the chroma of the target pixel and the maximum chroma in the correction area 602.

Figure 7:
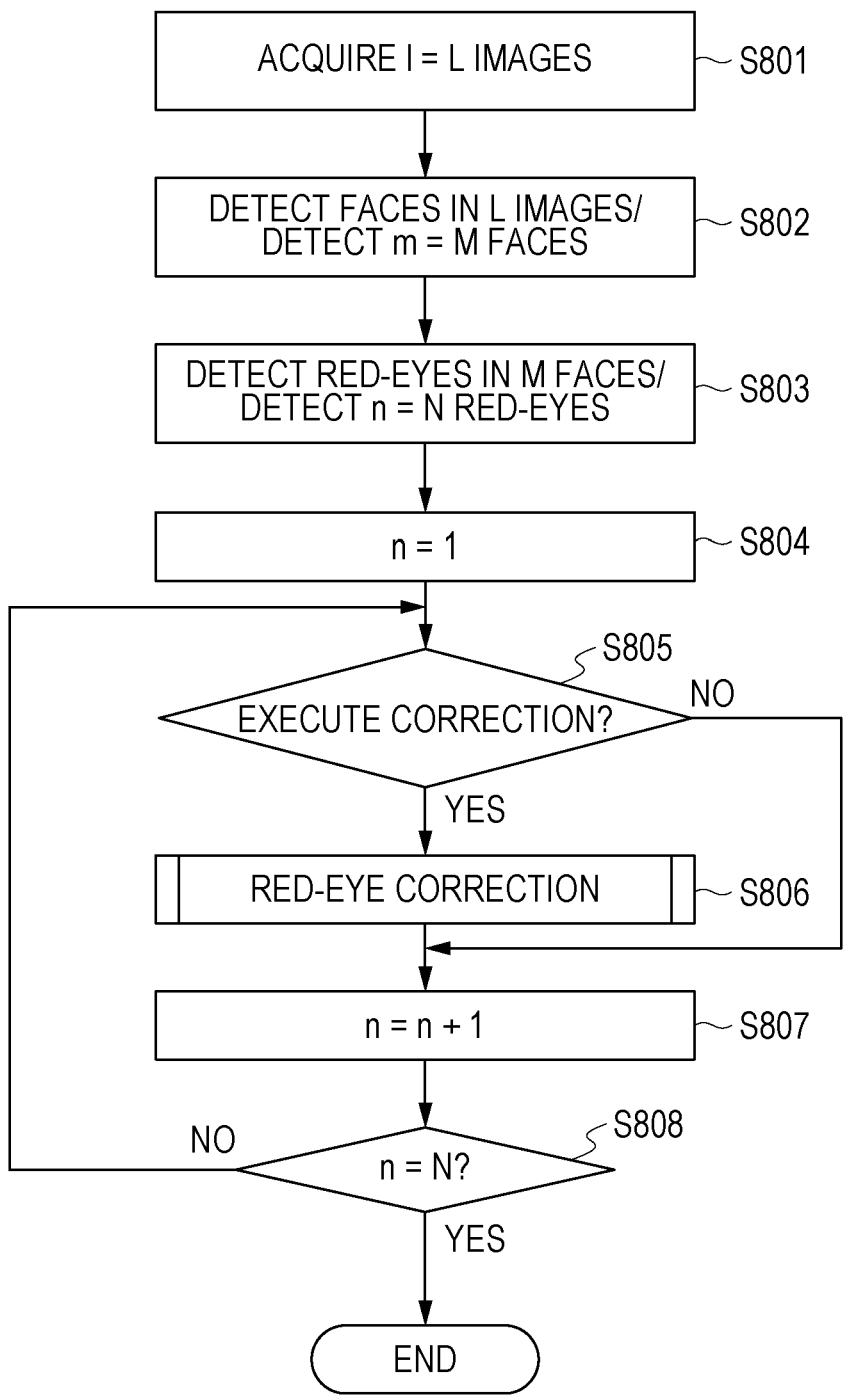
FIG. 7 is a flowchart of image processing according to the first embodiment.

Next, image processing will be described with reference to FIG. 7. FIG. 7 is a flowchart of image processing according to the present embodiment. This image processing is executed by the CPU 100. The process illustrated in FIG. 7 is based on the functional block diagram illustrated in FIG. 2A.

First, l=L images are acquired in S801. In the present embodiment, L is set to L=10. Ten images selected by the user using the input device 105 and the display device 104 from among the images stored in the secondary storage device 103 are acquired. After the ten acquired images are collectively stored in a database in the secondary storage device 103, all the images are input in S802.

Next, in S802, a face detection process of the acquired L images (ten images in the present embodiment) is performed. Here, the face detection unit 203 described above performs the face detection process. In the present embodiment, it is supposed that fifteen faces are detected by using a face detection algorithm which outputs the position and the direction of the face using the AdaBoost.

Here, the result of face detection will be described with reference to FIGS. 8A to 8C. FIG. 8A illustrates an example of the face detection result of the ten obtained images. The image ID is an ID for identifying each image, and the face detection number represents the number of faces detected in each image. The face ID is an ID for identifying each face. For example, face ID 1-1 is face 1 of image ID 1 and face ID 2-3 is face 3 of image ID 2. The coordinates are coordinates of each detected face. The face direction is expressed in five stages: the front face=0, the angled face directed to the left=1, the angled face directed to the right=2, the side face directed to the left=3 and the side face directed to the right=4. FIG. 8A illustrates that fifteen faces are detected from the ten obtained images: in particular, seven front faces, three angled faces directed to the left, two angled faces directed to the right, two side faces directed to the left, and one side face directed to the right are detected. Such a face detection result is stored in the database in the secondary storage device 103 in a general-purpose format, like the eXtensible MarkupLanguage (XML).

Next, in S803, the red-eye detection process is performed to the fifteen face detection areas. In the present embodiment, red-eye detection is performed in the following process: the area marked with a red circle is extracted by boundary tracking after extraction of the red-colored area by adaptive binarization in the red-eye detection unit 204, and then feature quantity determination is performed to the result. It is supposed that the image to be input in S803 is only the face area detected in S802. In particular, an image of which coordinates (four points: the upper left, the lower left, the upper right and the lower right) indicating the face area of each face illustrated in FIG. 8A is clipped from the original image is input in S803. n=N red-eyes are detected as a result of the red-eye detection process. In the present embodiment, as illustrated in FIG. 8B, FIG. 8B in which N=7 red-eyes are detected is a table in which the red-eye detection result of each face area of S803 is added to the face detection result of FIG. 8A. In FIG. 8B, the red-eye detection result represents the number of the detected red-eyes with respect to each face ID. This shows that seven red-eyes have been detected in the fifteen faces. The coordinates of this red-eye detection result are stored for each detected red-eye. The coordinates may be stored in addition to the format in which the face detection result is stored, or may be stored newly for each face.

In S805, determination is made as to whether correction is to be performed to the first red-eye area of the seven red-eye areas in which red-eyes are detected. Depending on the face direction, the correction standard is determined, i.e., whether correction is to be performed is determined (correction 1 or correction 0). In the present embodiment, whether red-eye correction is to be performed is determined depending on the face direction among five stages of the face directions. In the present embodiment, when the face is directed to the front and is angled, i.e., when the face direction is 0, 1 and 2, the face detection area is input in the red-eye correction S806 of the next step. When the face is directed to the side, i.e., when the face direction is 3 and 4, the process proceeds to S807 without inputting the face detection area in the red-eye correction S806 of the next step.

Red-eye correction is performed in S806. Here, the red-eye for which correction is determined to be made is input in the red-eye correction process and the red-eye correction is performed. The method described about the red-eye correction processing unit 206 is used for the method for the red-eye correction. The process then proceeds to S807.

In S807, n is set to n=n+1 and the process proceeds to S808. In S808, it is determined whether n=N or not and, if not n=N, the process returns to S805 where correction determination of the next red-eye is performed. In this manner, all the red-eye detection results are processed and the process is completed. In the present embodiment, the position and the direction of the face in each image are detected, the red-eye is detected depending on each detected face, and red-eye correction is performed depending on the face direction. That is, in the present embodiment, the red-eye detection result detected in S803 is treated as a "red-eye candidate" and whether red-eye correction is performed or not is determined depending on the face direction. In particular, in the present embodiment, when the face is directed to the side, the red-eye correction is not performed by not inputting the face detection area in S806.

This is because, when the face is directed to the side, the red-eye phenomenon is not likely to occur. Generally, as the flashlight enters from the direction close to the front direction of the face, a greater amount of red light reflected on the capillary vessels of the retina and made to shine returns to the camera and, therefore, the red-eye phenomenon is considered to be likely to occur. Accordingly, if the flashlight enters in the side direction of the face, reflection on the retina rarely occurs and, therefore, the red-eye phenomenon is not likely to occur.

Therefore, in the present embodiment, when the red-eye is detected from the face of the direction in which the red-eye is not likely to occur, i.e., when the red-eye is detected from the face which is directed to the side, the detection is determined to be erroneous detection and red-eye correction is not performed. Erroneous detection may thus be reduced.

For example, in the case of PCT Japanese Translation Patent Publication No. 2010-520567 described above, when the area of the red-eye candidate is close to the position of the eye, the red-eye correction is always performed. Therefore, since the red-colored area near the inner canthus is substantially appropriate as a position of the eye, red-eye correction is performed and the neighborhood of the inner canthus is corrected to black. Similarly, there is a possibility that inappropriate correction is performed when a red-eye candidate is detected near the outer canthus. Further, when a part of eyeglasses or a part of eyeglass frame shines red, there is a possibility that inappropriate correction is made similarly. According to the present embodiment, on the contrary, for example, when the face is directed to the side, by determining that the red-eye candidate is erroneously corrected and not correcting the same, erroneous correction of portions near the inter canthus, near the outer canthus, accessories and the like may be reduced.

As described above, in the present embodiment, erroneous correction may be reduced by excluding portions that may be determined not as red-eye from among the red-eye candidates depending on the face direction.

Second Embodiment

In the first embodiment, whether red-eye correction is to be performed is determined depending on the face direction. In the present embodiment, a correction amount is changed depending on face direction. Description is omitted about the same configuration as that of the first embodiment.

Figure 9:
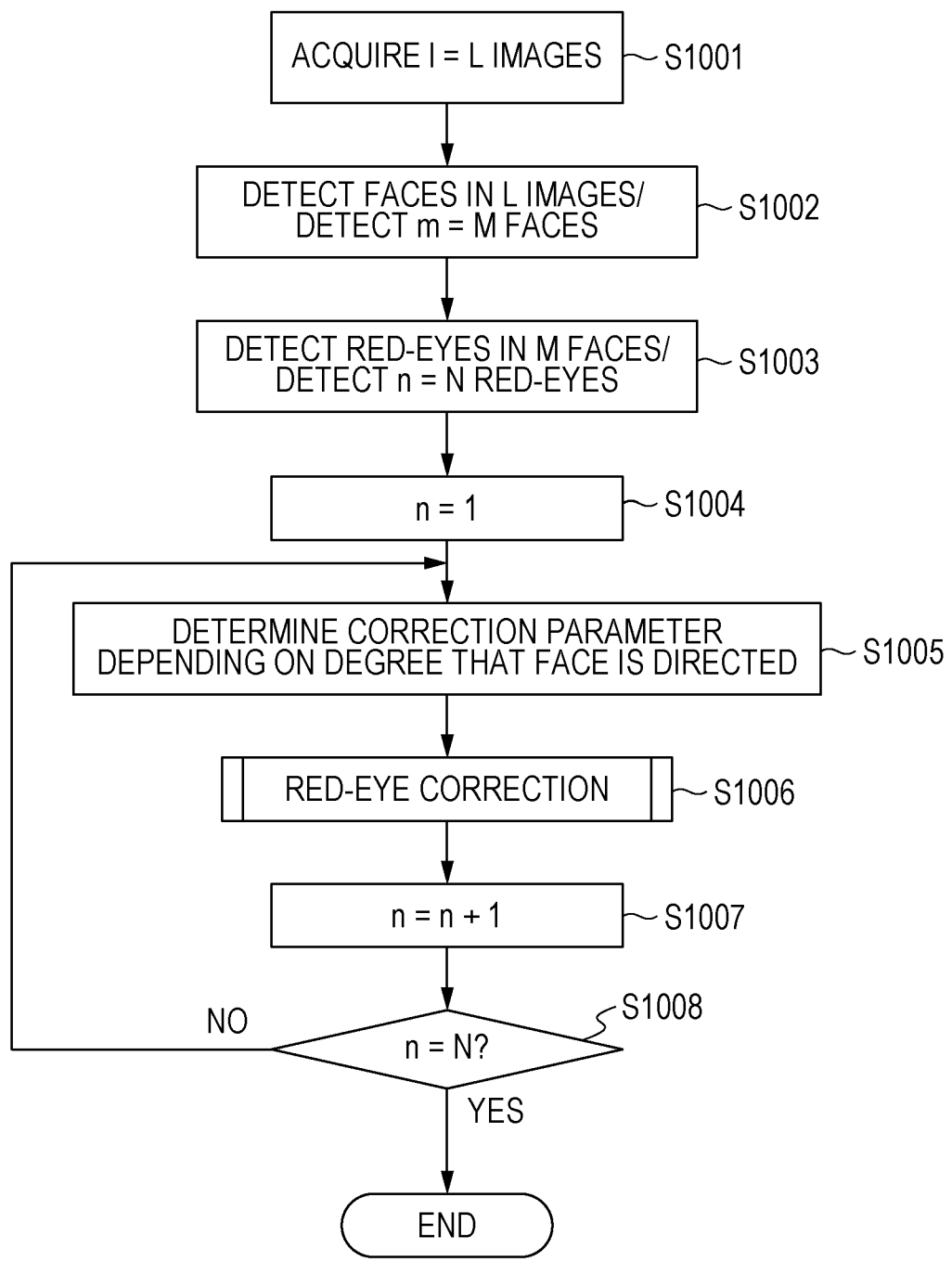
FIG. 9 is a flowchart of a red-eye correction process according to a second embodiment.

FIG. 9 is a flowchart of image processing according to the present embodiment. This process is executed by the CPU 100.

In FIG. 9, since S1001 to S1004 are the same processes as S801 to S804 in FIG. 7 of the first embodiment, description thereof will be omitted.

In S1005, a correction standard depending on the face direction is set. First, with respect to the first red-eye area among detected seven red-eye areas, a correction parameter is set depending on the face direction. In the present embodiment, the correction parameter is set for each face direction of the five stages described above. This correction parameter may be set in advance. As described above, the red-eye is likely to occur as the face direction approaches the front face and not likely to occur as the face direction approaches the side face and the degree of red color becomes significant in the front face. Therefore, for example, the red-eye correction parameter is set such that red-eye is corrected strongly as the face direction approaches the front face and weakly as the face direction approaches the side face. That is, the correction parameter is set such that the correction amount becomes small as the degree that the face is directed to the side becomes high.

In the present embodiment, with respect to each of the face directions, i.e., the front direction (face direction=0), the angled direction (face direction=1, 2) and the side direction (face direction=3, 4), both the weight parameters $W_y$ and $W_c$ of Equation (4), which expresses the correction amount described about the red-eye correction processing unit 206, are set to 1.0, 0.7 and 0.3. With reference to these set values, the correction parameter of the n=1 red-eye input in S1005 is determined.

Next, in S1006, the n=1st red-eye correction is performed in accordance with the determined correction parameter. The red-eye correction here is performed by the method described about the red-eye correction processing unit 206.

In S1007, n is set to n=n+1 and the process proceeds to S1008. In S1008, it is determined whether n=N or not and, if not n=N, the process returns to S1005 where a correction parameter is determined for the next red-eye depending on the degree that the face is directed. In this manner, S1005 to S1008 are performed to all the detected seven red-eyes and the process is completed.

Although both the weight parameters Wy and Wc for the front, angled and side directions are set to 1.0, 0.7 and 0.3 in the present embodiment, the red-eye of the side face is not corrected by setting the weight parameters Wy and Wc only for the side direction to 0.0 and, therefore, the same result as that of the first embodiment may be obtained as well.

In the present embodiment, the position and the direction of the face in each image are detected, the red-eye is detected depending on each detected face, and red-eye correction is performed in accordance with the red-eye correction parameter set depending on the face direction. In this manner, the correction amount of the red-eye correction may be reduced as the face direction approaches the direction in which red-eye is not likely to occur. Therefore, erroneous correction and excessive correction may be reduced.

In the present embodiment, as in the first embodiment, in a case in which the face is directed to the side, erroneous correction may be reduced by determining the red-eye detection result as erroneous detection and not performing the red-eye correction.

The red color of the red-eye is likely to be significant as the face direction approaches the front face. In the present embodiment, by setting the correction parameter depending on the face direction, excessive correction may be reduced by setting the correction parameter weakly when there is inconsistency between the face direction and the degree of the detected red-eye.

Third Embodiment

In the first and the second embodiments, the red-eye correction process based on the functional block diagram of FIG. 2A has been described. In the present embodiment, red-eye correction based on the functional block diagram of FIG. 2B will be described. Description is omitted about the same configuration as that of the first embodiment.

Figure 10:
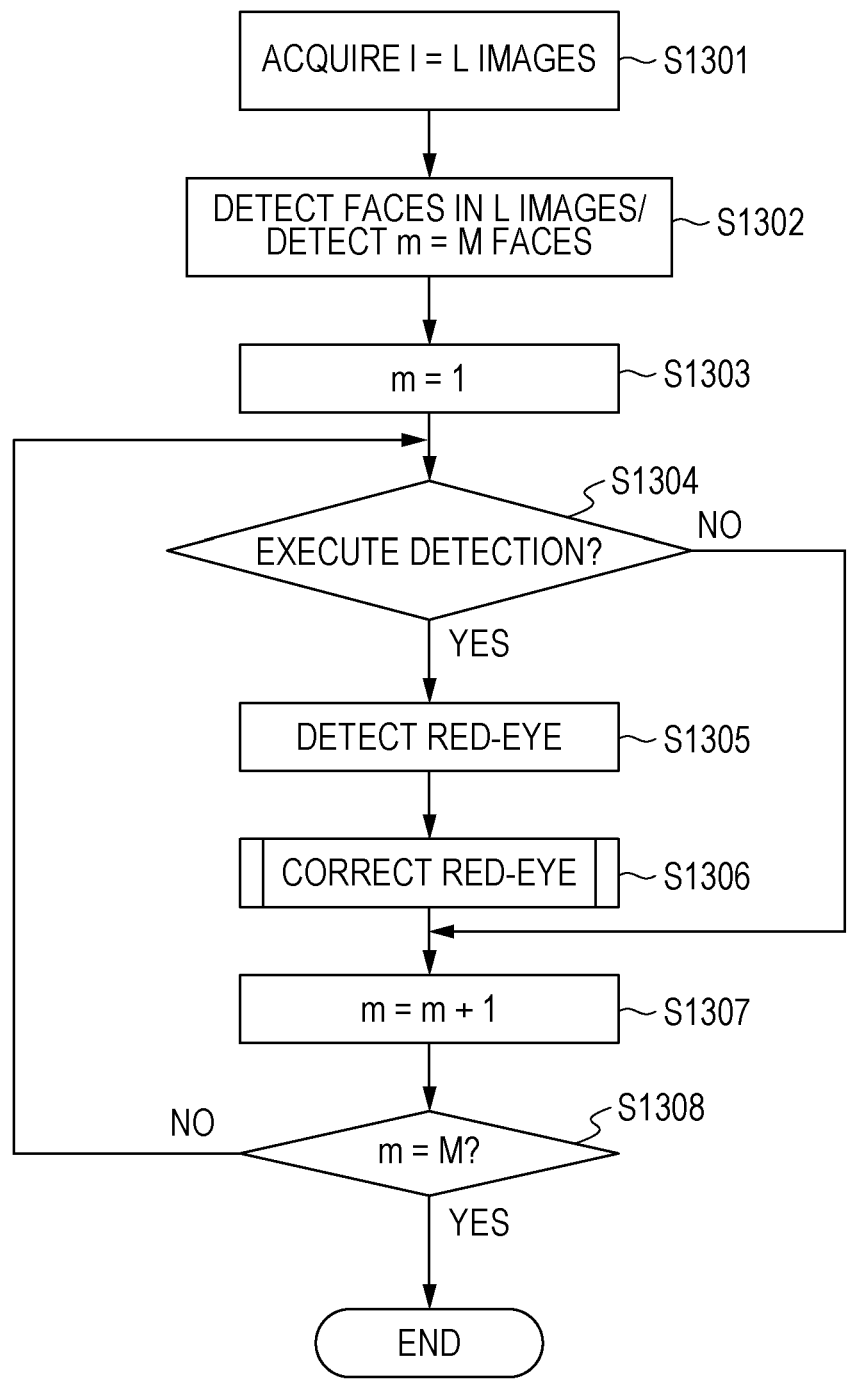
FIG. 10 is a flowchart of a red-eye correction process according to a third embodiment.

FIG. 10 is a flowchart illustrating image processing according to the present embodiment. Since S1301 to S1302 in FIG. 10 are the same as S801 to S802 of FIG. 7 according to the first embodiment and S1001 to S1002 of FIG. 9 according to the second embodiment, description thereof is omitted. The face detection result of S1302 is supposed to be M=15 in the same manner as in FIG. 8A.

In S1304, determination is made as to whether red-eye detection is to be performed to the first face area of the fifteen face detected areas. Depending on the face direction, a detection standard is determined, i.e., whether the red-eye detection is to be performed is determined (the detection threshold M or not). In the present embodiment, whether red-eye correction is to be performed is determined depending on the face direction among five stages of the face directions. Such determination may be set using parameters in advance and, in the present embodiment, when the face is directed to the front and is angled, i.e., when the face direction is 0, 1 and 2, it is set such that the face detection area is input in the red-eye detection S1305 of the next step.

When the face direction is 3 and 4, the process returns to S1304 via S1307 and S1308 where determination of the red-eye detection for the next face is made.

In S1305, the face for which red-eye detection is determined to be performed in S1304 is input in the red-eye detection process and red-eye detection is performed. The method for the red-eye detection is the same as that described regarding the red-eye detection unit 204. It is supposed that the image to be input in S1305 is only the face area detected in S1302. In particular, an image of which coordinates (four points: the upper left, the lower left, the upper right and the lower right) indicating the face area of each face illustrated in FIG. 8A is clipped from the original image is input in S1305.

FIG. 8C is a table in which the red-eye detection result of each face area of S1305 is added to the face detection result of FIG. 8A. The red-eye detection result represents the number of the detected red-eyes with respect to each face. In FIG. 8C, six red-eyes are detected in the fifteen faces. In the present embodiment, since the face for which red-eye detection is to be performed is selected depending on the face direction, three faces of face IDs 2-2, 4-1 and 6-1 are not input in the red-eye detection S1305. The coordinates of the red-eye detection result are stored for each detected red-eye as in the first and the second embodiments. The coordinates may be stored in addition to the format in which the face detection result is stored, or may be stored newly for each face.

Next, in S1306, the detected red-eye is input in the red-eye correction process and correction is performed. The red-eye correction is performed by the method described about the red-eye correction processing unit 206.

In the present embodiment, the position and the direction of the face in each image are detected, the red-eye is detected depending on each detected face, and then red-eye correction is performed. In the present embodiment, it is possible to set such that red-eye detection is not performed in the face of the direction in which the red-eye is not likely to occur. In this manner, erroneous detection in the direction in which red-eye is not likely to occur may be reduced. Therefore, erroneous correction of the red-eye may also be reduced.

Since the face of the direction in which the red-eye is not likely to occur is not input in the red-eye detection in the present embodiment, the detection speed of the entire input image may be increased.

Fourth Embodiment

In the first and the second embodiments, the red-eye correction process based on the functional block diagram of FIG. 2A has been described. In the present embodiment, red-eye correction based on the functional block diagram of FIG. 2B will be described. Description is omitted about the same configuration as that of the first embodiment.

In the present embodiment, faces of all the directions are input for red-eye detection and detectability in the red-eye detection depending on the face direction, i.e., a detection threshold, is set.

Figure 11:
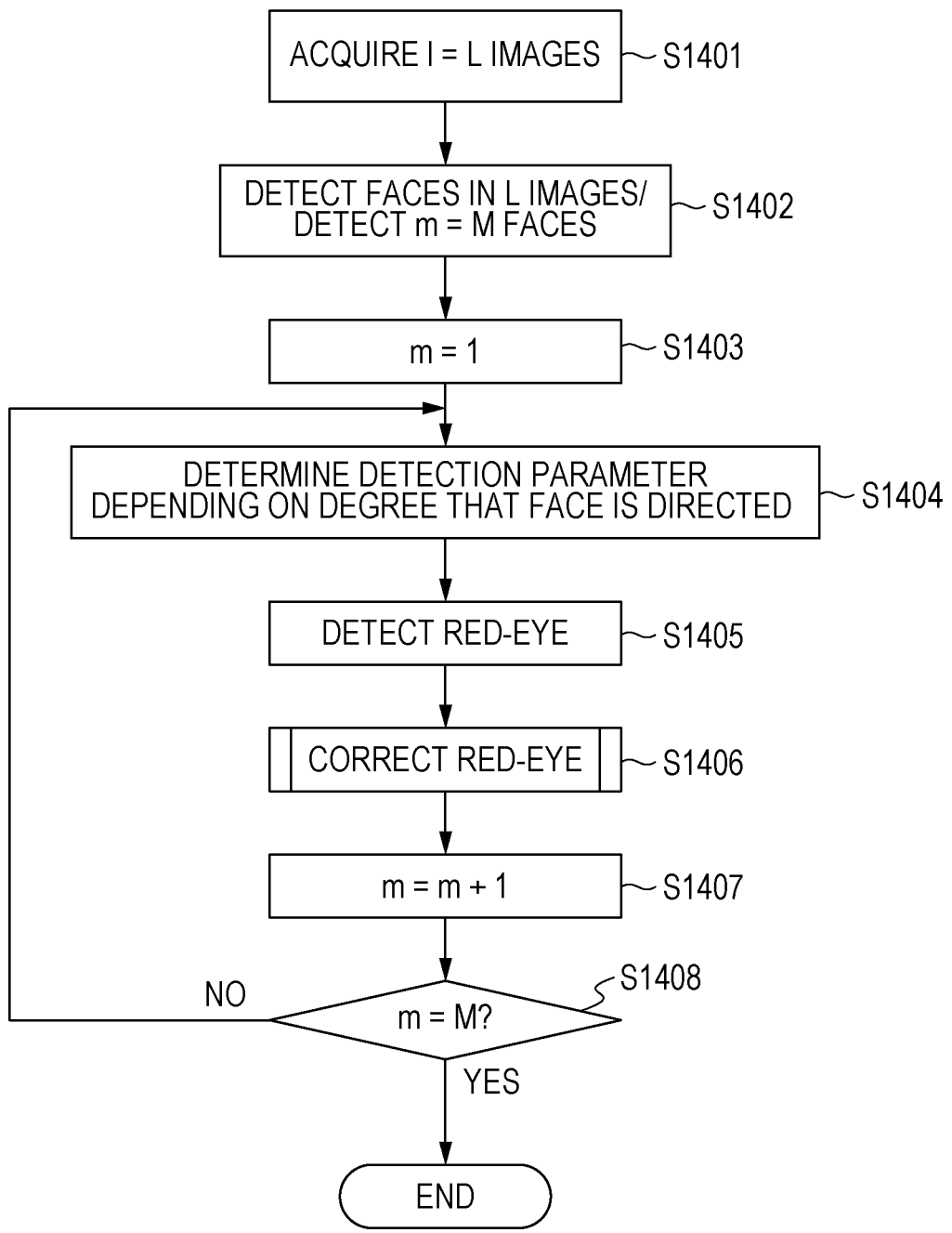
FIG. 11 is a flowchart of a red-eye correction process according to the third embodiment.

FIG. 11 is a flowchart of image processing according to the present embodiment. This process is executed by the CPU 100.

Since S1401 to S1403 in FIG. 11 are the same as S1301 to S1303 described in the third embodiment, description thereof is omitted.

In S1404, a detection standard depending on the face direction is set. In the present embodiment, with respect to the first face area among detected fifteen face areas, a red-eye detection parameter is first set depending on the face direction. In the present embodiment, the correction parameter is set for each face direction of the five stages described above. This red-eye detection parameter may be set in advance. In the present embodiment, with respect to each of the face directions, i.e., the front direction (face direction=0), the angled direction (face direction=1, 2) and the side direction (face direction=3, 4), a threshold described about extraction of the red-colored area by adaptive binarization of the red-eye detection unit 204 is set. With reference to these set values, the red-eye detection parameter of the m=1st red-eye input in S1404 is determined. Since the red-eye is likely to occur as the face direction approaches the front face and not likely to occur as the face direction approaches the side face, the red-eye detection parameter is set such that, for example, the red-eye is more easily detected as the face direction approaches the front face and less easily detected as the face direction approaches the side face. That is, the red-eye detection parameter is set such that the detection standard becomes high as the degree that the face is directed to the side becomes high.

In S1405, red-eye detection process of the m=1st face is performed in accordance with the determined red-eye detection parameter. The red-eye correction is performed by the method described about the red-eye correction processing unit 206. In S1407, m is set to m=m+1 and the process proceeds to S1408. In S1408, it is determined whether m=M or not and, if not m=M, the process returns to S1404 where a correction parameter is determined for the next red-eye depending on the degree that the face is directed. In this manner, S1404 to S1408 are performed to all the detected fifteen faces and the process is completed.

Although the red-eye detection parameter is set for each of the front, angled and side directions in the present embodiment, the same result as that of the third embodiment may be obtained as well by setting a parameter with which the red-eye is reliably not detected only for the side face.

In the present embodiment, the position and the direction of the face in each image are detected, the red-eye detection is performed using the red-eye detection parameter set depending on the face direction and then red-eye correction is performed. In this manner, red-eye is less likely to be detected as the face is directed to the direction in which the red-eye is not likely to occur and thus erroneous detection may be reduced.

According to the embodiment described above, detection and correction of image area representing a defective color tone of the eye may be performed appropriately. Therefore, erroneous detection and erroneous correction may be reduced.

The basic configuration of the present invention is not limited to the configuration described above. The embodiments described above merely are means to obtain the effect of the present invention, and other similar methods and different parameters may be included in the scope of the present invention as long as the effect equivalent to that of the present invention is obtained.

In the first and the second embodiments, face detection is performed for all the obtained images, red-eye detection is performed for all the acquired images, and then determination as to whether red-eye correction is to be performed, setting of the red-eye correction parameter, and red-eye correction are performed to each of the detected red-eyes. However, the present invention is not limited to the same.

Figure 12:
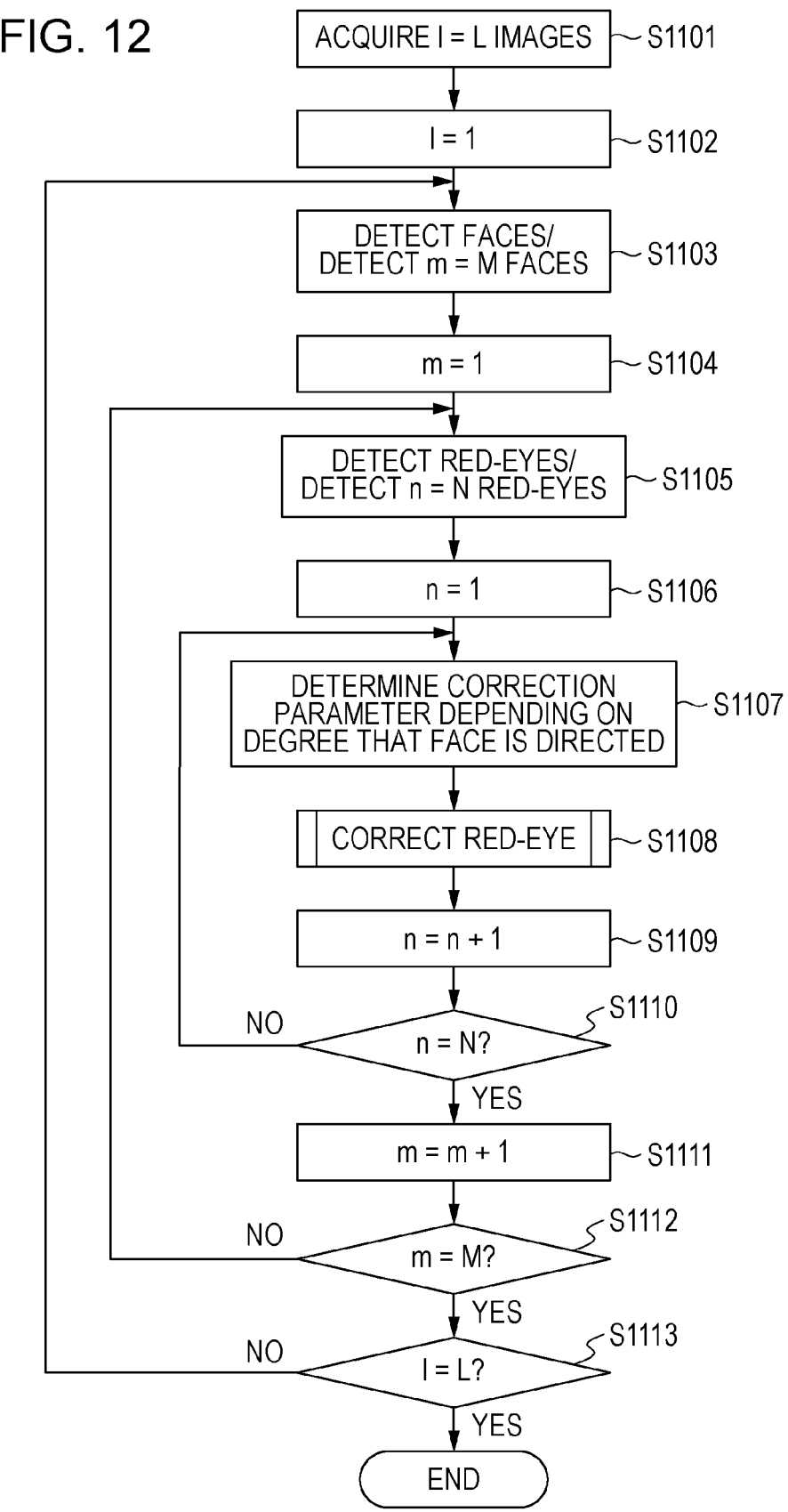
FIG. 12 is a flowchart of a red-eye correction process according to another embodiment.
Figure 13:
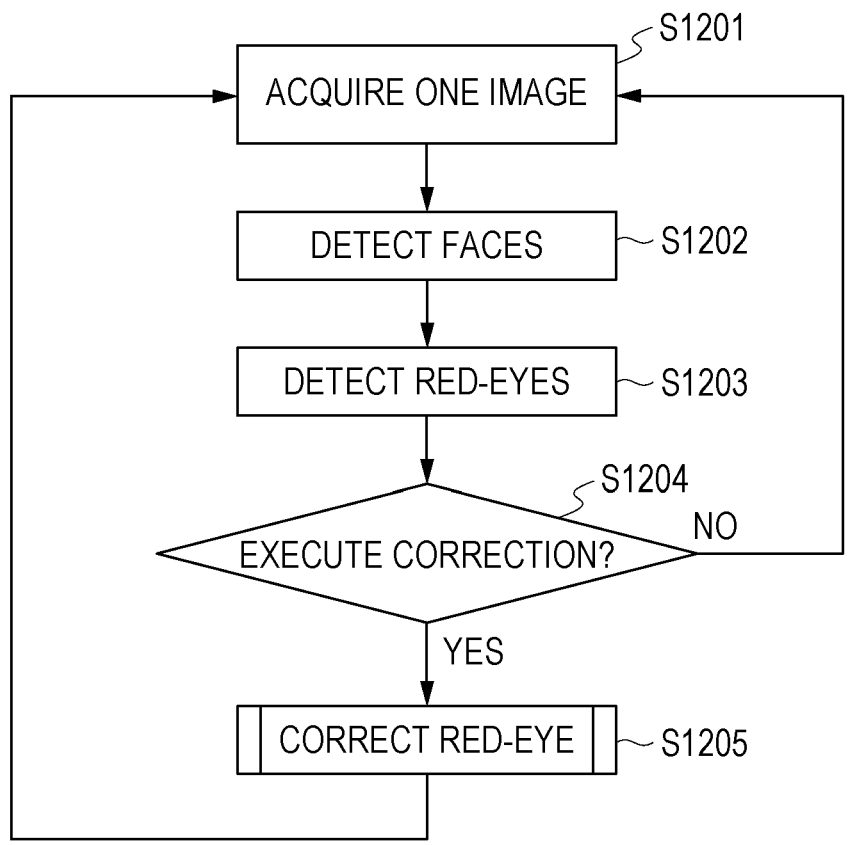
FIG. 13 is a flowchart of a red-eye correction process according to another embodiment.

For example, the same effect may be obtained in the procedures illustrated in FIGS. 12 and 13. That is, as illustrated in FIG. 12, face detection, red-eye detection, red-eye correction parameter setting and red-eye correction may be performed to each one piece of the acquired image data. Further, as illustrated in FIG. 13, face detection, red-eye detection, determination as to whether the correction is to be performed, and red-eye correction may be performed each time one piece of image data is acquired and then the next image may be acquired. For example, when image processing is performed in the external image pickup device 111, or if the image is acquired from the internal image pickup device 106 each time the image is picked up, the method illustrated in FIG. 13 may be used suitably.

Figure 14:
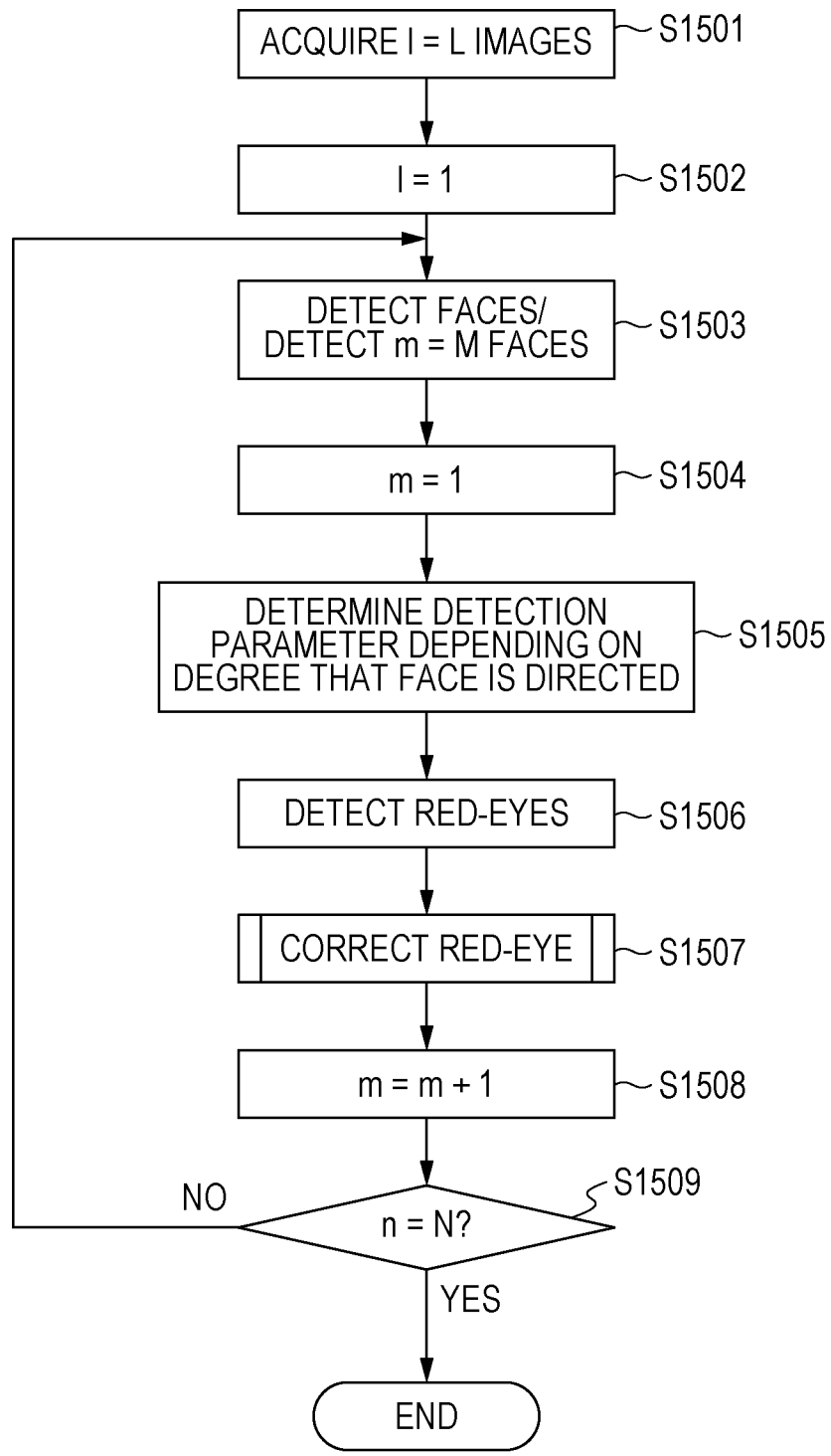
FIG. 14 is a flowchart of a red-eye correction process according to another embodiment.

In the third and the fourth embodiments, face detection is performed collectively for all the acquired images in S1302 and S1402, and then determination as to whether the red-eye detection is to be performed, setting of the red-eye detection parameter, and red-eye correction are performed to each of the detected faces. However, the present invention is not limited to the same. For example, the same effect may be obtained in the procedures illustrated in FIGS. 14 and 15 which will be described below. That is, as illustrated in FIG. 14, face detection, red-eye correction parameter setting, red-eye detection, and red-eye correction may be performed to each of the plural acquired images. Further, as illustrated in FIG. 15, face detection, determination as to whether the correction is to be performed, red-eye detection, and red-eye correction may be performed each time one image is acquired and then the next image may be acquired. When image processing is performed in the external image pickup device 111, or if the image is acquired from the internal image pickup device 106 each time the image is picked up, the method illustrated in FIG. 15 may be used suitably.

In the foregoing embodiments, plural images are input and the position and the direction of the face in each image are detected at the timing at which the plural images are acquired. However, the present invention is not limited to the same and detection may be made at, for example, the timing designated by the user.

In the foregoing embodiments, the computer is described as an example of the image processing apparatus, but the invention is not limited to this. For example, the present invention may be applied to apparatuses which performs image processing, such as a printer, a copier, a facsimile machine, a mobile phone, a PDA, an image viewer and a digital camera.

Further, the present invention may be applied to a system constituted by plural apparatuses (for example, a host computer, an interface device, a reader and a printer), or may be applied to an apparatus constituted by a single apparatus (for example, a printer, a copier and a facsimile machine).

The foregoing embodiments may be implemented also by performing the following process. That is, software (a program) for implementing the functions of the foregoing embodiments is supplied to a system or an apparatus via a network or various storage media, and a computer (CPU, MPU and the like) of the system or the apparatus reads and executes the program. The program may be executed on a single computer or may be executed cooperatively on plural computers. It is not necessary to implement all of the foregoing processes by software, but a part or all of them may be implemented by hardware.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137053, filed Jun. 28, 2013, which is hereby incorporated by reference herein in its entirety.

What is claimed is:

1. An apparatus comprising:
one or more memories; and
one or more processors, the one or more processors being configured to:
specify a face direction in an image which includes a face;
detect a red-eye area in the face which is included in the image; and
correct the detected red-eye area in accordance with a correction parameter which is changed depending on the specified face direction.

2. The apparatus according to claim 1, wherein the correction parameter is set such that a correction amount in the red-eye area is changed depending on the specified face direction.

3. The apparatus according to claim 1, wherein the face direction includes a degree that the face is directed to a side with respect to a front, and wherein the correction parameter is set such that a correction amount becomes smaller as a degree that the face in the image is directed to a side becomes higher with respect to a front.

4. The apparatus according to claim 1, wherein the correction parameter is set such that the detected red-eye area is not corrected if the face in the image is directed to a side.

5. The apparatus according to claim 1, wherein the one or more processors are further configured to detect the face direction in the image,
wherein the face direction in the image is specified in accordance with a detected result.

6. The apparatus according to claim 1, wherein the one or more processors are further configured to acquire one or more images,
wherein the face direction in each image is specified at timing at which the image is acquired.

7. The apparatus according to claim 1, wherein the face direction is a face direction in a yawing direction.

8. An apparatus comprising:
one or more memories; and
one or more processors, the one or more processors being configured to:
specify a face direction in an image which includes a face; and
detect a red-eye area in the face included in the image in accordance with a detection threshold of a red-eye area detection, the detection threshold being changed depending on the specified face direction.

9. The apparatus according to claim 8, wherein the detection is set such that it is determined whether the red-eye area is to be detected or not depending on the specified face direction.

10. The apparatus according to claim 8, wherein the detection threshold is set higher as a degree that the face is directed to a side in the image becomes higher with respect to a front.

11. The apparatus according to claim 8, wherein the detection threshold is set such that the red-eye area is not detected if the face in the image is directed to a side with respect to a front.

12. The apparatus according to claim 8, wherein the one or more processors are further configured to correct the detected red-eye area.

13. The apparatus according to claim 8, wherein the one or more processors are further configured to detect the face direction in the image,
wherein the face direction in the image is specified in accordance with a detected result.

14. The apparatus according to claim 8, wherein the one or more processors are further configured to acquire one or more images,
wherein the face direction in each image is specified at timing at which the image is acquired.

15. The apparatus according to claim 8, wherein the face direction is a face direction in a yawing direction.

16. A method of controlling an image processing apparatus comprising one or more processors and one or more memories, the method comprising:
at the image processing apparatus, specifying a face direction in an image including a face;
detecting a red-eye area in the face included in the image; and
correcting the detected red-eye area in accordance with a correction parameter which is changed depending on the specified face direction,
wherein the one or more processors perform the specifying, the detecting, and the correcting.

17. A method for an image processing apparatus comprising a memory and one or more processors, the method comprising:
at the image processing apparatus, specifying a face direction in an image including a face; and
detecting a red-eye area in a face included in the image in accordance with a detection threshold of a red-eye area detection, the detection threshold being changed depending on the face direction,
wherein the one or more processors perform the specifying and the detecting.

18. A non-transitory computer-readable recording medium storing computer executable instructions that cause a computer to implement a method, the method comprising:
specifying a face direction in an image including a face;
detecting a red-eye area in the face included in the image; and
correcting the detected red-eye area in accordance with a correction parameter which is changed depending on the specified face direction.

19. A non-transitory computer-readable recording medium storing computer executable instructions that cause a computer to implement a method, the method comprising:

specifying a face direction in an image including a face; and detecting a red-eye area in a face included in the image in accordance with a detection threshold of a red-eye area detection, the detection threshold being changed depending on the face direction.

* * * * *